US012683928B2

(12) United States Patent　　　(10) Patent No.:　US 12,683,928 B2
　Kaimal et al.　　　　　　　　　　(45) Date of Patent:　　　Jul. 14, 2026

(54) HYBRID WEB APPLICATION FIREWALL

(71) Applicant: Sophos Limited, Abingdon (GB)

(72) Inventors: Biju Ramachandra Kaimal, Bangalore (IN); Jeffrey Martin Green, Brentwood, TN (US); Alan Charles Toews, Billerica, MA (US); Laxmikant Agarwal, Bengaluru (IN); Anoop Kodakkal Valappil, Bangalore (IN); Praneeth Kumar Reddy Earikireddy, YSR District (IN); Kranthi Kiran Dharani Pragada, Bangalore (IN); Deepak Tiwari, Delhi (IN)

(73) Assignee: Sophos Limited (GB)

( * ) Notice: Subject to any disclaimer, the term of this patent is extended or adjusted under 35 U.S.C. 154(b) by 432 days.

(21) Appl. No.: 17/750,703

(22) Filed: May 23, 2022

(65) Prior Publication Data

US 2023/0319012 A1　　Oct. 5, 2023

(30) Foreign Application Priority Data

Mar. 31, 2022　(IN) ............................. 202211019563

(51) Int. Cl.
　H04L 9/40　　　　(2022.01)
(52) U.S. Cl.
　CPC ...... H04L 63/0263 (2013.01); H04L 63/0281 (2013.01)
(58) Field of Classification Search
　CPC ........................ H04L 63/0263; H04L 63/0281
　See application file for complete search history.

(56) References Cited

U.S. PATENT DOCUMENTS

2016/0088020 A1*　3/2016　Chan ....................... G06F 16/22
　　　　　　　　　　　　　　　　　726/1
2018/0234310 A1*　8/2018　Ingalls .................... H04L 41/12
　　　　　　(Continued)

FOREIGN PATENT DOCUMENTS

WO　　2022147436 A1　　7/2022

OTHER PUBLICATIONS

International Search Report for UK Patent Application No. 2303418. 4, Sep. 13, 2023, 4 pages.

*Primary Examiner* — William R Korzuch
*Assistant Examiner* — Forrest L Carey
(74) *Attorney, Agent, or Firm* — Danielson Legal LLC

(57)　　　　　ABSTRACT

Threat management devices and methods for a containerized firewall. The methods may include receiving instructions to configure a web application firewall being executed within a first container-based architecture, wherein the received instructions include changes to a previous network traffic policy; storing the received instructions as a changelog that indicates an updated network traffic policy to be implemented by the web application firewall; and communicating the updated network traffic policy to a first object store associated with the first container-based architecture and to a proxy service associated with the web application firewall. The methods may further include configuring the web application firewall based on the updated network traffic policy communicated to the proxy service; monitoring, using the web application firewall, first network traffic originating within the first container-based architecture and second network traffic originating external to the first container-based architecture; and processing the first network traffic or the second network traffic in accord with the updated network traffic policy.

20 Claims, 4 Drawing Sheets

(56) References Cited

U.S. PATENT DOCUMENTS

| | | | |
|---|---|---|---|
| 2020/0228486 A1* | 7/2020 | Park | H04L 61/4511 |
| 2020/0358686 A1 | 11/2020 | Lewis | |
| 2021/0112032 A1 | 4/2021 | DiRosa et al. | |
| 2022/0210122 A1* | 6/2022 | Levin | H04L 61/2514 |
| 2023/0081612 A1* | 3/2023 | Wang | H04L 63/0272 |
| | | | 726/12 |
| 2023/0247055 A1* | 8/2023 | Castro de Rosa | H04L 63/0272 |
| | | | 726/3 |

* cited by examiner

HYBRID WEB APPLICATION FIREWALL

CROSS-REFERENCE TO RELATED APPLICATIONS

The present application is the domestic filing of and claims the benefit of co-pending Indian Patent Application No. 202211019563, filed in India on Mar. 31, 2022.

TECHNICAL FIELD

The present application relates generally to systems and methods for monitoring network activity and, more particularly but not exclusively, to filtering network activity in container-based architectures

BACKGROUND

Web application firewalls (WAF) traditionally provide protection for applications running on bare-metal servers or virtual machines. The applications on these servers or machines are addressed using an internet protocol (IP) address or a fully qualified domain name (FQDN).

In container-based environments, however, applications cannot be directly accessed through IP addresses or FQDNs that are addressable outside of the container environment. Accordingly, web applications in these environments cannot be protected using traditional WAF products or WAF products bundled in next-generation firewalls (NGFWs). These web applications therefore remain exposed or vulnerable to threats.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

Embodiments herein provide a hybrid WAF that runs inside a container-based architecture. The hybrid WAF acts as a proxy and has direct access to web applications inside the container-based architecture. Additionally, the hybrid WAF can protect web applications further downstream and outside of the container-based architecture. The hybrid WAF may route web traffic from a web application via IP addresses, FQDNs, or some combination thereof.

Accordingly, the embodiments herein provide protection for web applications in a container-based architecture as well as those external to the container-based architecture.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
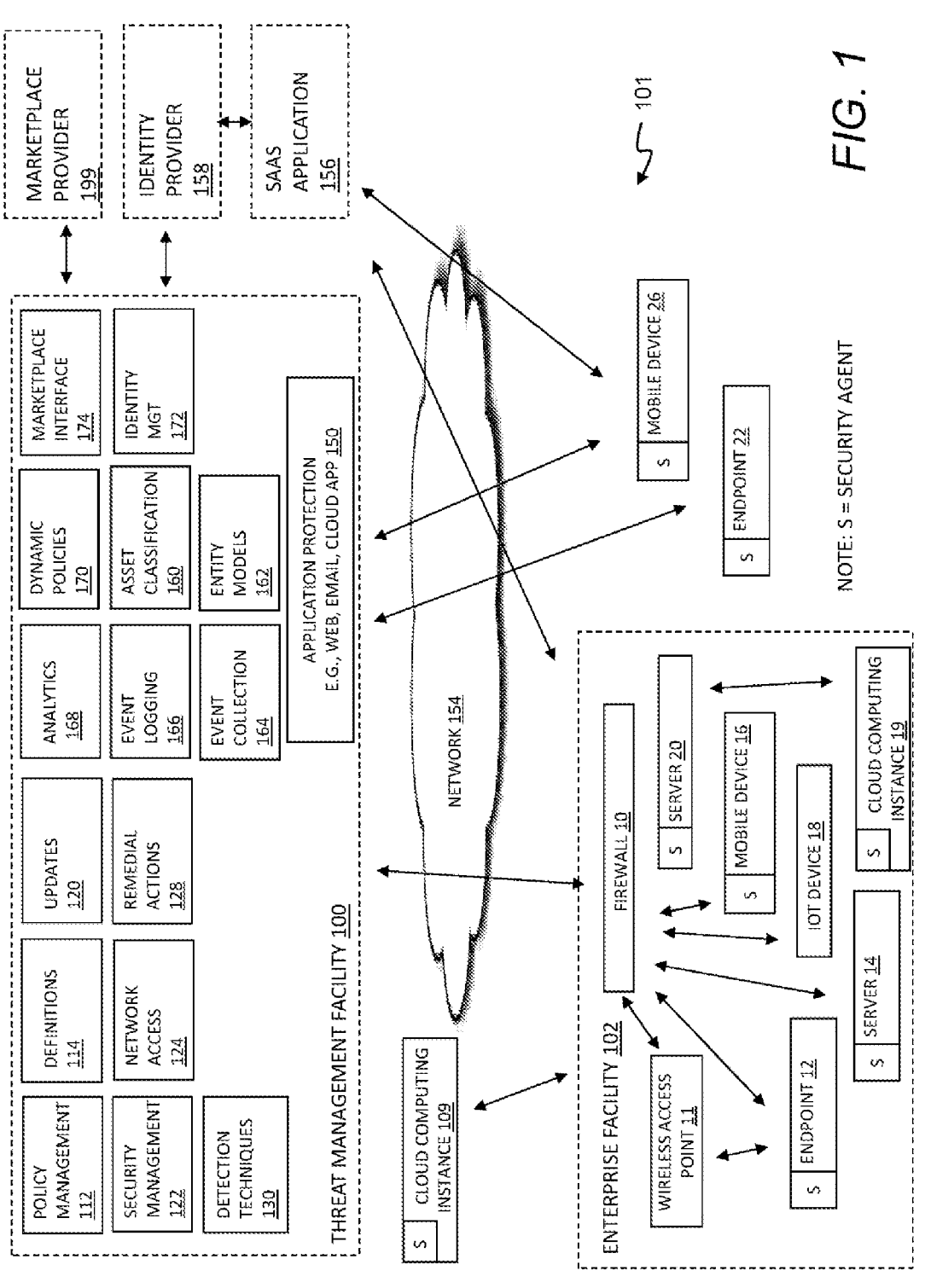
FIG. 1 illustrates a block diagram of a threat management system in accordance with one embodiment.

Various embodiments are described more fully below with reference to the accompanying drawings, which form a part hereof, and which show specific embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

As discussed above, embodiments herein provide a hybrid WAF that not only provides protection for web applications within a container-based architecture, but also for web applications external to the container-based architecture. Web applications inside container-based architectures may be addressed using metadata such as a cluster's internal FQDN. The FQDNs may track the IP addresses of a web application to provide a stable address for use by the WAF.

Additional metadata may be collected from the container-based architecture to help an administrator or other interested party configure WAF protection rules. Metadata may include, for example, namespaces, namespace labels, service labels, service ports, etc. This metadata may be used to populate a configuration user interface (UI) to enable an administrator to construct, view, and modify WAF rules to protect web applications associated with the WAF.

FIG. 1 illustrates a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the threat management system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

As one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, the enterprise facility 102 may be or may include any networked computer-based infrastructure. For example, the enterprise facility 102 may be corporate, commercial, organizational, educational, governmental, or the like. As home networks become more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is by way of example, and it will be understood that there may be any number of compute instances, less or more of each type of compute instances, and other types of compute instances. As shown, the enterprise facility includes a firewall 10, a wireless access point 11, an endpoint 12, a server 14, a mobile device 16, an appliance or Internet-of-Things (IOT) device 18, a cloud computing instance 19, and a server 20. Again, the compute instances 10-20 depicted are by way of example, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access facility 124, remedial action facility 128, detection techniques facility 130, application protection 150, asset classification facility 160, entity model facility 162, event collection facility 164, event logging facility 166, analytics facility 168, dynamic policies facility 170, identity management facility 172, and marketplace interface facility 174, as well as other facilities. For example, there may be a testing facility, a threat research facility, and other facilities (not shown). It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility 102. Some or all of one or more of the facilities 100, 112-174 may be provided on the same physical hardware or logical resource as a gateway, such as a firewall 10, or wireless access point 11. Some or all of one or more of the facilities 100, 112-174 may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility 100. For example, the marketplace provider 199 may subscribe to and receive certain events, and in response, based on the received events and other events available to the marketplace provider 199, send inferences to the marketplace interface facility 174, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider 158 may be any system or entity that creates, maintains, and manages identity information for principals while providing authentication services to relying party applications, e.g., within a federation or distributed network. The identity provider 158 may, for example, offer user authentication as a service, where other applications, such as web applications, outsource the user authentication step(s) to a trusted identity provider.

In embodiments, the identity provider 158 may provide user identity information, such as multi-factor authentication, to a software-as-a-service (SaaS) application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 or other type of computing device outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop or other type of public location. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22 or 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Examples of commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination thereof.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to the facility 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in a security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, or unwanted applications; help control web browsing; and the like, which may provide comprehensive web access control to enable safe and productive web browsing. Web security and control may provide Internet use policies, reporting on suspect compute instances, security and content filtering, active monitoring of network traffic, Uniform Resource Identifier (URI) filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Examples of rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. These policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of Universal Serial Bus (USB) disks, and the policy management facility 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security management facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, macOS, OS X, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility 100 may include the entity model facility 162. The entity models may be used, for example, to determine the events that are generated by assets. For example, some operating systems may provide useful information for detecting or identifying events. For examples, operating systems may provide process and usage information that accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. One example of an event is the communication of a specific packet over the network. Another example of an event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 128 may take any steps or deploy any measures suitable for addressing a detection of a threat, potential threat, policy violation or other event, code or activity that might compromise security of a computing instance 10-26 or the enterprise facility 102.

Figure 2:
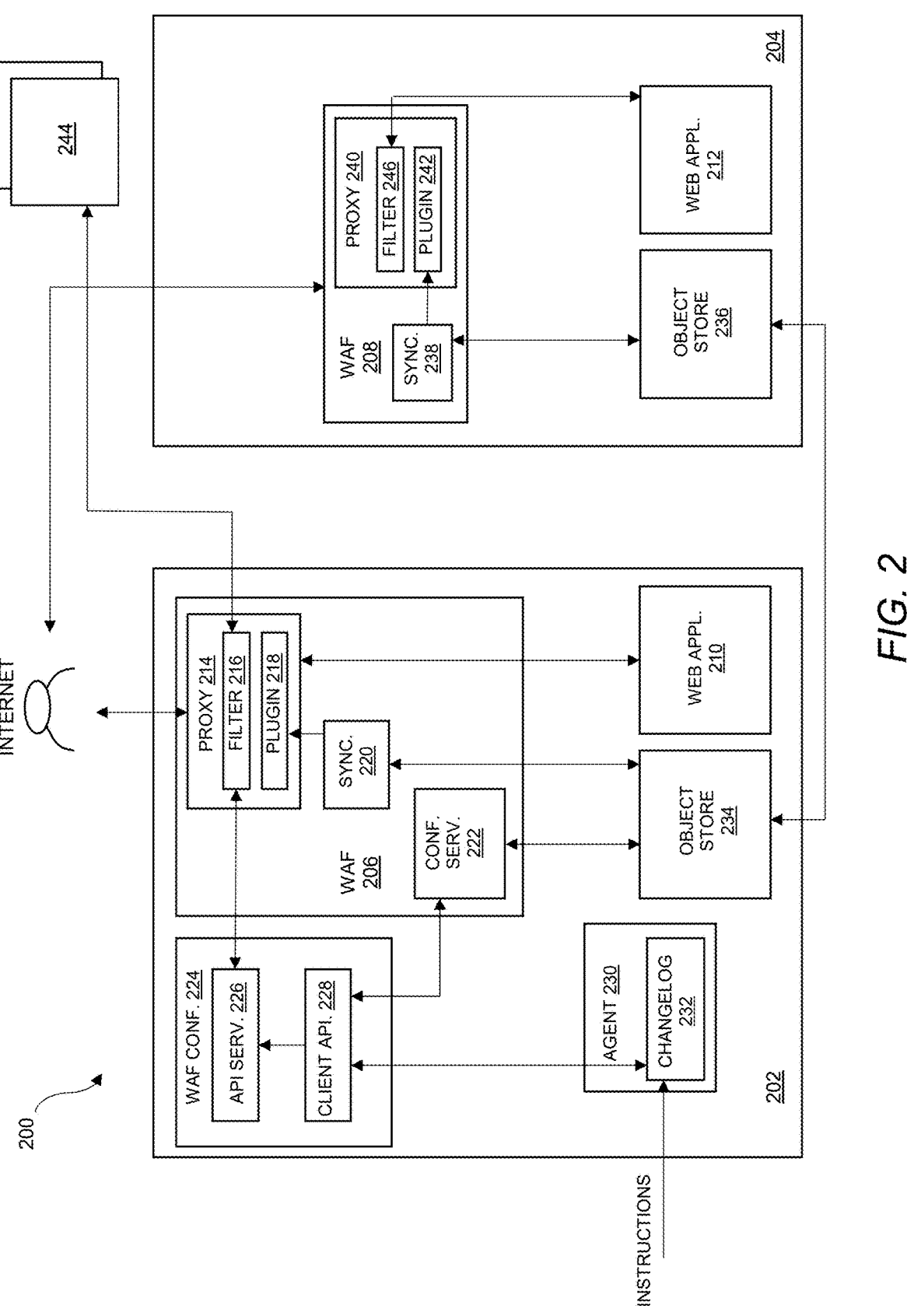
FIG. 2 illustrates a container-based architecture in accordance with one embodiment.

FIG. 2 illustrates a system 200 for operating a containerized firewall in accordance with one embodiment. The system 200 may execute in a container framework such as the KUBERNETES® or DOCKER® framework. Although the present application is discussed largely in the context of Kubernetes, the embodiments herein may be implemented in conjunction with any type of container-based architecture or framework.

The system 200 may include at least a first container-based architecture 202 (e.g., a first node in a container-based cluster) and a second container-based architecture 204 (e.g., a second node in a container-based cluster) in communication with the first container-based architecture 202. The first container-based architecture 202 may be configured to execute a first WAF 206, and the second container-based architecture 204 may be configured to execute a second WAF 208.

The first container-based architecture 202 may receive configuration instructions from a system or administrator overseeing the system 200 or components thereof. For example, an administrator may view on a user interface all web applications 210 and 212 running in each container-based architecture. Similarly, the administrator may create different protection rules for each WAF or web application.

The WAF 206 may include or otherwise execute a plurality of containers, including a proxy service 214 with a filter 216 and a WAF plugin component 218, a synchronization component 220, and a configuration server 222. The proxy service 214 enables the WAF 206 to filter traffic emanating from the internet that attempts to reach the web application 210. Accordingly, the web application 210 is not directly exposed to internet traffic.

In operation, an administrator may use a user interface to configure one or more WAFs in the system 200. An administrator may define WAF rules, specify which ports and protocols are to be used, which routes are to be taken for network traffic, etc.

These configuration parameters or instructions may be communicated to an agent 230 executing on the first container-based architecture 202. The received instructions include changes to a previous network traffic policy to provide an updated network traffic policy for the WAF 206. For example, an administrator may want to change how the WAF 206 processes certain traffic intended for the web application 210. It is noted that the "previous network traffic policy" need not be previously-defined. In other words, the previous network traffic policy may refer to an instance in which no policy existed for the WAF 206. In this case, the updated network traffic policy may be the first policy created for the WAF 206.

The agent 230 may process the received instructions, such as by processing a JavaScript Object Notation (JSON) envelope to identify the required changes. For example, the agent 230 may download and process a Changelog 232 that represents the changes.

The changes may refer to the WAF 206, but also various other sub-systems or components of the first container-based architecture 202. The agent 230 may perform any appropriate validation steps and forward the configuration changes to a Client API 228 of a WAF configuration service 224 and to any other services such as the configuration server 222 of the WAF 206. The WAF configuration service 224 may perform any required validation steps before communicating the configuration instructions to the filter 216. The agent 230 may store enough configuration data to at least be used as a reference for configuration. A single rule or instruction regarding an WAF 206 may be split into multiple security policies or profiles.

The API service 226 may leverage the configuration instructions received from the client API 228 to create a configuration blob containing routing information for the proxy service 214. The API service 226 and filter 216 may be implemented as ENVOY® servers, for example. The filter 216 may then be configured based on the configuration file. The configuration file may specify one or more constructs that specify how the filter 216 forwards traffic. For example, in the case of ENVOY® servers, an administrator may specify which ports are used, how routes are configured (e.g., based on FQDN or paths), how to connect to upstream servers, and certificates and keys for upstream servers.

The WAF configuration service 224 or components thereof may communicate using any appropriate communication protocol. For example, the API service 226 may be configured as a Remote Procedure Call (gRPC) API. Regardless of the exact configurations of these components, the proxy service 214 may periodically poll the WAF configuration service 224 for updates.

The configuration server 222 of the WAF 206 may be in communication with an object store 234 for transmitting and receiving rules or policies regarding operation of the WAF 206. The object store 234 may include MINIO® storage, S3, or any other type of storage whether available now or invented hereafter as long as the features of the embodiments herein may be accomplished.

The synchronization component 220 may periodically reference the object store 234 to ensure the WAF 206 is complying with the most recent configuration policies. The synchronization component 220 may communicate configuration data to the WAF plugin component 218, and any required updates or changes to the filter 216 can be made.

The object store 234 of the first container-based architecture 202 may be in communication with the object store 236 of the second container-based architecture 204. Policy changes or updates can therefore be replicated between the two architectures 202 and 204. This ensures that the respective WAFs of each architecture are up-to-date with the most recent policies. Additionally, as new applications are added, one or more policies stored in the object stores 234 or 236 may be enabled for the new applications.

The synchronization component 238 of the second container-based architecture 204 can periodically reference the object store 236 for one or more policies regarding how the WAF 208 should be configured. The synchronization component 238 of the second container-based architecture 204 may communicate any appropriate configuration data to the proxy service 240 of the second WAF 208. Specifically, the synchronization component 238 may communicate the configuration data to the WAF plugin component 242 to configure the filter 246 accordingly. The WAF 208, by way of the configured filter 246, can then filter internet traffic to the web application 212 in accord with a network traffic policy The WAF 206 may also monitor and filter activity intended for one or more legacy applications 244 external to the container-based architectures. For example, the WAF 206 may protect applications 244 that are downstream and outside of the first container-based architecture 202 by routing traffic through the use of IP addresses, FQDNs, or some combination thereof.

Figure 3:
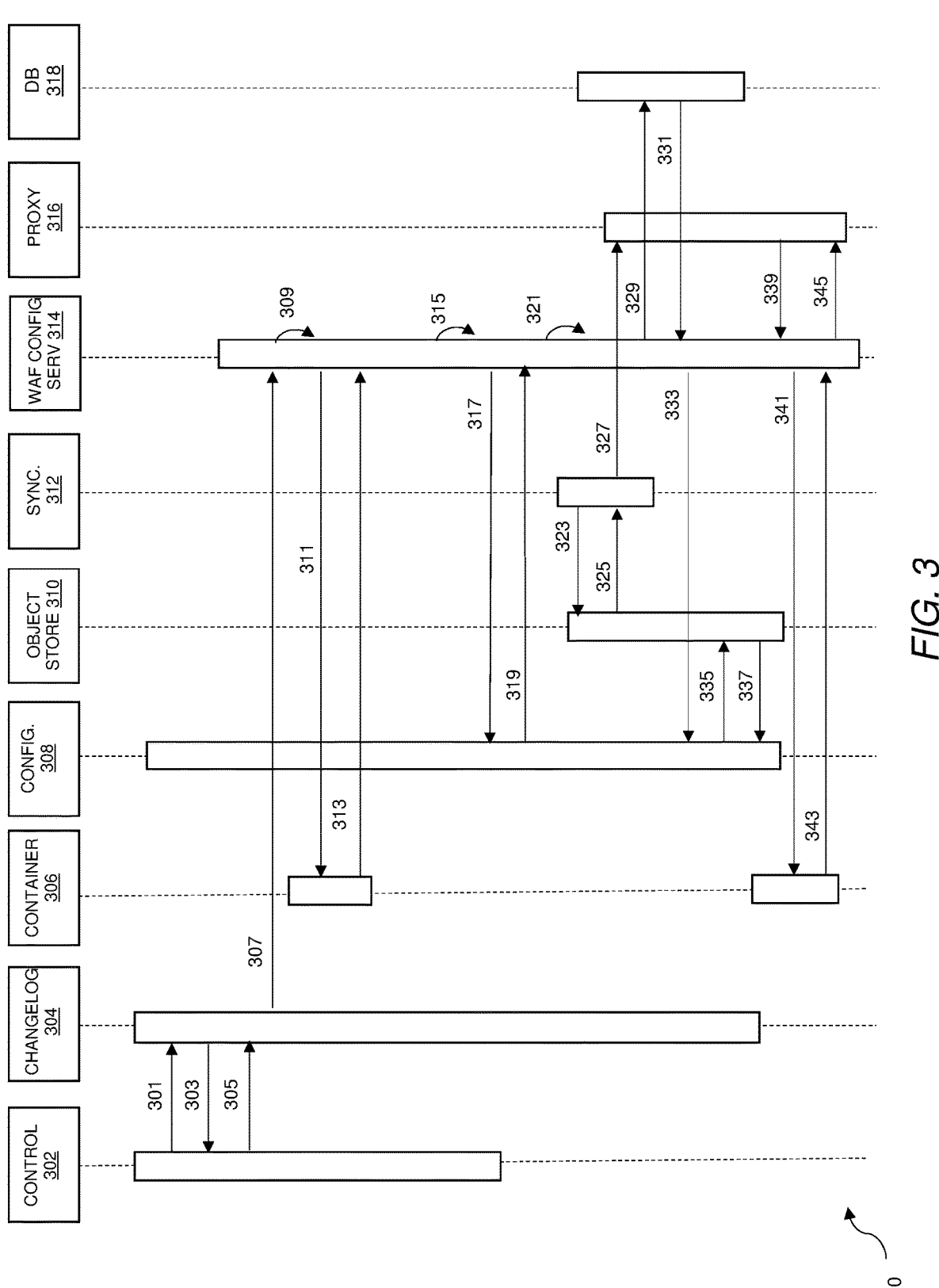
FIG. 3 illustrates a sequence diagram for operating a container-based architecture in accordance with one embodiment.

FIG. 3 illustrates a sequence diagram 300 for operating a container-based architecture in accordance with one embodiment. The container-based architecture referred to in FIG. 3 may be similar to the container-based architecture 202 of FIG. 2 and include similar components thereof. The sequence diagram 300 is illustrated as operating in a Kubernetes framework. However, similar steps may be taken in any type of container-based architecture or framework, whether available now or invented hereafter.

A central control 302, which may be operated by an administrator, may first issue 301 a notification to a Changelog processor 304 indicating that configuration changes have been made. This central control 302 may be executed as part of a threat management facility such as the threat management facility 100 of FIG. 1.

The Changelog processor 304 may be part of an agent such as the agent 230 of FIG. 2. The Changelog processor 304 may then query 303 the central control 302 for the provided changes. The central control 302 may respond 305 to the Changelog processor 304 with the required changes.

In some embodiments, rather than waiting for a notification from central control 302, the Changelog processor 304 may periodically poll the central control 302 for updates. The frequency at which the Changelog processor 304 polls the central control 302 may depend on preferences of an administrator, computing resources available, web application(s) executing in the container-based architecture, or the like.

The Changelog processor 304 may then provide 307 a WAF configuration service 312 with the appropriate certificate(s) required for the changes. The WAF configuration service 312 may be similar to the WAF configuration service 224 of FIG. 2, for example.

The WAF configuration service 312 may then may prepare 309 the appropriate secrets (e.g., k8s secrets). The WAF configuration service 312 may also receive and process any add, delete, or modification instructions.

If the WAF configuration service 312 is configured for an ENVOY® server, it may have several different constructs or APIs for configuring how the WAF forwards traffic upstream. These may include a Listener Discovery Service (LDS), a Route Discovery Service (RDS), a Cluster Discovery Service (CDS), a Secrets Discovery Service (SDS), or some combination thereof. The WAF configuration service 312 may then contact 311 one or more containers 306 to obtain relevant configuration data, and the appropriate container(s) 306 may respond 313 with the relevant data. For example, the WAF configuration service 312 may read relevant configuration data from a Redis database for application configuration data, and read relevant secrets data from a vault service.

The WAF configuration service 312 may then prepare 315 instructions for the proxy service 314. The updates may be communicated 317 to the configuration server 308, which may acknowledge 319 receipt. The configuration server 308 may be similar to the configuration server 222 of FIG. 2, for example, and the WAF configuration service 312 may save 321 the updated proxy configuration data.

The WAF configuration service 312 may also communicate 323 the configuration updates to a Redis database 316, which may then acknowledge 325 receipt of the updates. The WAF configuration service 312 may publish 327 the changes to the configuration server 308. The published changes may also be saved 329 to an object store 310, such as the object store 234 of FIG. 2, and a confirmation response may be sent 331 to the configuration server 308. Although not illustrated in FIG. 3, confirmation responses regarding this and other steps may also be communicated to components of an agent such as the agent 230 of FIG. 2.

The proxy service 314 may periodically poll 333 the WAF configuration service 312 for configuration or policy updates. The proxy service 314 or the WAF configuration service 312 may reference 335 or otherwise query one or more appropriate container(s) 306 for the required certificate secrets, and the container(s) 306 may respond 337 with the appropriate certificate(s). The WAF configuration service 312 may then communicate 339 any updated configuration instructions to the proxy service 314.

Figure 4:
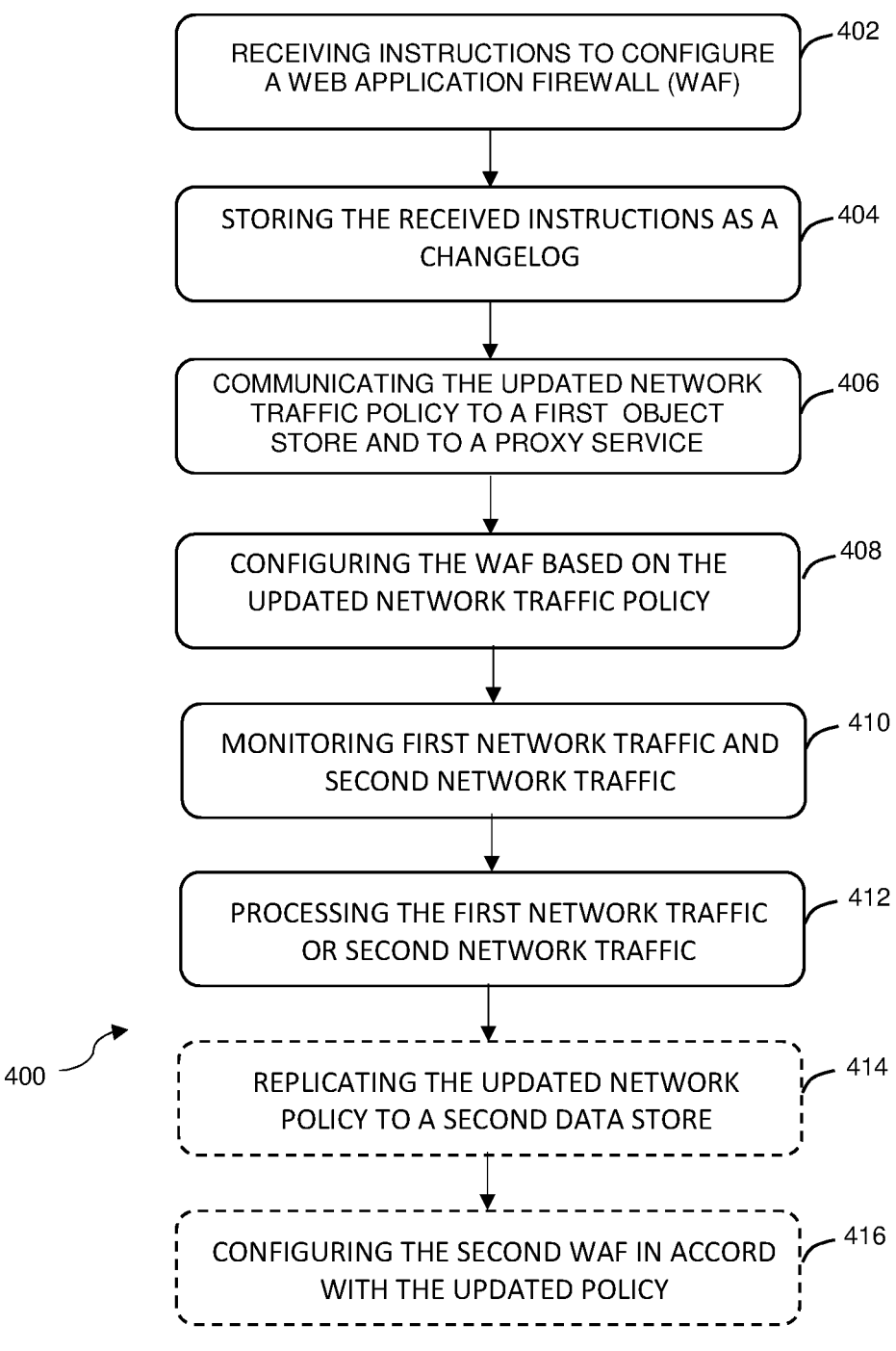
FIG. 4 depicts a flowchart of a method for operating a containerized firewall in accordance with one embodiment.

FIG. 4 depicts a flowchart of a method 400 for operating a containerized firewall in accordance with one embodiment. The systems or components thereof of any one of FIGS. 1-3 may perform the steps of method 400.

Step 402 involves receiving instructions to configure a web application firewall being executed within a first container-based architecture, wherein the received instructions include changes to a previous network traffic policy. The WAF may be similar to the WAF 206 of FIG. 2, for example.

The "previous network traffic policy" may refer to a NULL policy or otherwise to situations in which no network policy existed. In these situations, the changes to the previous network traffic policy refer to the creation of a network traffic policy.

Step 404 involves storing the received instructions as a changelog that indicates an updated network traffic policy to be implemented by the web application firewall. For example, an agent such as the agent 230 of FIG. 2 may download the received instructions and execute a changelog processor to process the changes.

Step 406 involves communicating the updated network traffic policy to a first object store associated with the first container-based architecture and to a proxy service associated with the web application firewall. The first object store may be similar to the object store 234 of FIG. 1, for example. The object store may subsequently be periodically referenced by the WAF or a supporting component to confirm the WAF is configured appropriately.

Step 408 involves configuring the web application firewall based on the updated network traffic policy communicated to the proxy service. The proxy service may be similar to the proxy service 214 of FIG. 2, for example. The updated network traffic policy may instruct the proxy service how to direct traffic to a web application executing inside the first container-based architecture, for example.

Step 410 involves monitoring, using the web application firewall, first network traffic originating within the first container-based architecture and second network traffic originating external to the first container-based architecture. This step may involve monitoring the first network traffic, the second network traffic, or both.

Step 412 involves processing the first network traffic or the second network traffic in accord with the updated network traffic policy. The updated network traffic policy may instruct the proxy service or otherwise the WAF to prevent certain traffic from accessing a web application in the first container-based architecture. As another example, the updated network traffic policy may instruct the proxy service or otherwise the WAF regarding which IP addresses or FQDNs to use to route traffic to one or more legacy applications outside of the first container-based architecture. Step 412 may involve processing the first network traffic, the second network traffic, or both.

Step 414 may be optional and involves replicating the updated network traffic policy from the first object store to a second object store associated with a second container-based architecture including a second web application firewall. The second object store may be similar to the second object store 236 of FIG. 2, for example. Accordingly, the updated network traffic policy can be shared with multiple container-based architectures and without requiring further input by an administrator.

Step 416 may be optional and involves configuring the second web application firewall in accord with the updated network traffic policy. Accordingly, multiple WAFs across different container-based architectures can be configured in accord with the updated network traffic policy and without requiring further input by an administrator. The first and second container-based architectures may each include a synchronization component to periodically reference their respective object stores to confirm their respective WAFs are configured appropriately.

According to one aspect, embodiments relate to a method for operating a containerized firewall. The method includes receiving instructions to configure a web application firewall being executed within a first container-based architecture, wherein the received instructions include changes to a previous network traffic policy; storing the received instructions as a changelog that indicates an updated network traffic policy to be implemented by the web application firewall; communicating the updated network traffic policy to a first object store associated with the first container-based architecture and to a proxy service; configuring the web application firewall based on the updated network traffic policy communicated to the proxy service; monitoring, using the web application firewall, first network traffic originating within the first container-based architecture and second network traffic originating external to the first container-based architecture; and processing the first network traffic or the second network traffic in accord with the updated network traffic policy.

In some embodiments, the method further includes periodically referencing the first object store to obtain configuration data, and confirming the web application firewall is configured in accord with the configuration data obtained from the first object store.

In some embodiments, the method further includes replicating the updated network traffic policy from the first object store to a second object store associated with a second container-based architecture including a second web application firewall, and configuring the second web application firewall in accord with the updated network traffic policy. In some embodiments, the method further includes periodically referencing the second object store to obtain configuration data, and confirming the second web application firewall is configured in accord with the configuration data obtained from the second object store.

In some embodiments, the updated network traffic policy is specific to an application.

In some embodiments, processing the first network traffic includes identifying metadata associated with the first network traffic, and transmitting the metadata to prepopulate a user interface.

In some embodiments, processing the first network traffic includes identifying a web application associated with the first network traffic executing in the first container-based architecture, and enabling specification of the updated network traffic policy for the web application.

According to another aspect, embodiments relate to a system for operating a containerized firewall. The system includes a web application firewall being executed within a first container-based architecture; an interface for at least receiving instructions to configure the web application firewall, wherein the received instructions include changes to a previous network traffic policy; a changelog processor configured to process the received instructions as a changelog that indicates an updated network traffic policy to be implemented by the web application firewall; a first object store configured to store the updated network traffic policy; and a proxy service associated with the web application firewall to configure the web application firewall based on the updated network traffic policy, wherein the web application firewall is configured to monitor first network traffic originating within the first container-based architecture and second network traffic originating external to the first container-based architecture, and process the first network traffic or the second network traffic in accord with the updated network traffic policy.

In some embodiments, the system further includes a synchronization component executing in the first container-based architecture and configured to periodically reference the first object store to obtain configuration data, and confirm the web application firewall is configured in accord with the configuration data obtained from the first object store.

In some embodiments, the system further includes a configuration service executing in the first container-based architecture to receive the changelog from the changelog processor and communicate configuration instructions to the proxy service to configure the web application firewall based on the updated network traffic policy.

In some embodiments, the system further includes a second container-based architecture executing a second web application firewall, and a second object store associated with the second container-based architecture, wherein the updated network traffic policy is replicated from the first object store to the second object store to configure the second web application firewall in accord with the updated network traffic policy.

In some embodiments, the system further includes a second synchronization component executing in the second container-based architecture and configured to: periodically reference the second object store to obtain configuration data, and confirm the second web application firewall is configured in accord with the configuration data obtained from the second object store.

In some embodiments, the updated network traffic policy is specific to an application.

In some embodiments, the proxy service processes the first network traffic by identifying metadata associated with the first network traffic, and transmitting the metadata to prepopulate a user interface.

In some embodiments, the proxy service processes the first network traffic by identifying metadata associated with the first network traffic, and transmitting the metadata to prepopulate a user interface.

In some embodiments, the proxy service processes the first network traffic by identifying a web application associated with the first network traffic executing in the first container-based architecture, and enabling specification of the updated network traffic policy for the web application.

According to yet another aspect, embodiments relate to a computer program product for operating a containerized firewall. The computer program product includes computer executable code embodied in one or more non-transitory computer readable media that, when executing on one or more processors, performs the steps of: receiving instructions to configure a web application firewall being executed within a first container-based architecture, wherein the received instructions include changes to a previous network traffic policy; storing the received instructions as a changelog that indicates an updated network traffic policy to be implemented by the web application firewall; communicating the updated network traffic policy to a first object store associated with the first container-based architecture and to a proxy service associated with the web application firewall; configuring the web application firewall based on the updated network traffic policy communicated to the proxy service; monitoring, using the web application firewall, first network traffic originating within the first container-based architecture and second network traffic originating external to the first container-based architecture; and processing the first network traffic or the second network traffic in accord with the updated network traffic policy.

In some embodiments, the computer program further includes computer executable code that, when executing on one or more processors, performs the steps of periodically referencing the first object store to obtain configuration data, and confirming the web application firewall is configured in accord with the configuration data obtained from the first object store.

In some embodiments, the computer program product further includes computer executable code that, when executing on one or more processors, performs the steps of replicating the updated network traffic policy from the first object store to a second object store associated with a second container-based architecture including a second web application firewall, and configuring the second web application firewall in accord with the updated network traffic policy.

In some embodiments, the computer program product further includes computer executable code that, when executing on one or more processors, performs the steps of periodically referencing the second object store to obtain configuration data, and confirming the second web application firewall is configured in accord with the configuration data obtained from the second object store.

In some embodiments, the updated network traffic policy is specific to an application.

The embodiments herein therefore provide an improved manner for processing web traffic. Specifically, the embodiments provide protection for applications executing in a container-based architecture as well as for legacy (i.e., non-container) environments. This hybrid WAF therefore eliminates the need for deploying multiple software products that are each specifically configured for either container-based applications or legacy applications. This reduces computing resources and the amount of time that would be required for configuring multiple software products.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for operating a containerized firewall, the method comprising:

receiving instructions to configure a web application firewall being executed within a first container-based architecture, wherein the web application firewall executes a plurality of containers including a proxy service and a filter and the received instructions include changes to a previous network traffic policy;

storing the received instructions as a changelog that indicates an updated network traffic policy to be implemented by the web application firewall;

communicating the updated network traffic policy to:
    a first object store associated with the first container-based architecture,
    a proxy service associated with the web application firewall;

receiving at an application programming interface (API) service configuration data of the updated network traffic policy, wherein the configuration data includes routing information for the proxy service and specifies which ports are to be used for routing traffic, how routes are to be configured, and certificates and keys for servers;

monitoring, using the web application firewall, first traffic to a web application running in the first container-based architecture and second traffic intended for a non-container application that is outside of the first container-based architecture; and processing the first network traffic based on the updated network traffic policy by using a fully qualified domain name (FQDN) to track the IP address of the web application running in the first container-based architecture; and processing the second network traffic based on the updated network traffic policy in accordance with the configuration data received by the API service by routing traffic to the application that is outside of the first container-based architecture through the use of at least one fully qualified domain name (FQDN).

2. The method of claim 1 further comprising:

periodically referencing the first object store to obtain configuration data, and confirming the web application firewall is configured in accord with the configuration data obtained from the first object store.

3. The method of claim 1 further comprising:

replicating the updated network traffic policy from the first object store to a second object store associated with a second container-based architecture including a second web application firewall, and configuring the second web application firewall in accord with the updated network traffic policy.

4. The method of claim 3 further comprising:

periodically referencing the second object store to obtain configuration data, and confirming the second web application firewall is configured in accord with the configuration data obtained from the second object store.

5. The method of claim 1 wherein the updated network traffic policy is specific to an application.

6. The method of claim 1 wherein processing the first network traffic includes:

identifying metadata associated with the first network traffic, and transmitting the metadata to prepopulate a user interface.

7. The method of claim 1 wherein processing the first network traffic includes:

identifying the web application associated with the first network traffic executing in the first container-based architecture, and enabling specification of the updated network traffic policy for the web application.

8. A system for operating a containerized firewall, the system comprising:

a web application firewall being executed within a first container-based architecture, wherein the web application firewall executes a plurality of containers including a proxy service and a filter;

an interface for at least receiving instructions to configure the web application firewall, wherein the received instructions include changes to a previous network traffic policy;

a changelog processor configured to process the received instructions as a changelog that indicates an updated network traffic policy to be implemented by the web application firewall;

a first object store comprising a memory configured to store the updated network traffic policy;

an application programming interface (API) service positioned to receive from the changelog processor configuration data of the updated network traffic policy including routing information for the proxy service, wherein the configuration data specifies which ports are to be used for routing traffic, how routes are to be configured, and certificates and keys for servers, wherein the web application firewall is configured to:

monitor first traffic to a web application running in the first container-based architecture and second traffic intended for a non-container application that is outside of the first container-based architecture, and process the first network traffic based on the updated network traffic policy by using a fully qualified domain name (FQDN) to track the IP address of the web application running in the first container-based architecture; and process the second network traffic based on the updated network traffic policy in accordance with the configuration data received by the API service by routing traffic to the application that is outside of the first container-based architecture through the use of at least one FQDN.

9. The system of claim 8, further comprising a synchronization component executing in the first container-based architecture and configured to:

periodically reference the first object store to obtain configuration data, and confirm the web application firewall is configured in accord with the configuration data obtained from the first object store.

10. The system of claim 8, further comprising a configuration service executing in the first container-based architecture to receive the changelog from the changelog processor and communicate configuration instructions to the proxy service to configure the web application firewall based on the updated network traffic policy.

11. The system of claim 8, further comprising:

a second container-based architecture executing a second web application firewall, and a second object store associated with the second container-based architecture, wherein the updated network traffic policy is replicated from the first object store to the second object store to configure the second web application firewall in accord with the updated network traffic policy.

12. The system of claim 11, further comprising a second synchronization component executing in the second container-based architecture and configured to:

periodically reference the second object store to obtain configuration data, and confirm the second web application firewall is configured in accord with the configuration data obtained from the second object store.

13. The system of claim 8 wherein the updated network traffic policy is specific to an application.

14. The system of claim 8 wherein the proxy service processes the first network traffic by:

identifying metadata associated with the first network traffic, and transmitting the metadata to prepopulate a user interface.

15. The system of claim 8 wherein the proxy service processes the first network traffic by:

identifying the web application associated with the first network traffic executing in the first container-based architecture, and enabling specification of the updated network traffic policy for the web application.

16. A computer program product for operating a containerized firewall, the computer program product comprising a non-transitory computer readable media that includes computer executable code that, when executing on one or more processors, performs the steps of:

receiving instructions to configure a web application firewall being executed within a first container-based architecture, wherein the web application firewall executes a plurality of containers including a proxy service and a filter and the received instructions include changes to a previous network traffic policy;

storing the received instructions as a changelog that indicates an updated network traffic policy to be implemented by the web application firewall;

communicating the updated network traffic policy to:

a first object store associated with the first container-based architecture, and a proxy service associated with the web application firewall;

receiving at an application programming interface (API) service configuration data of the updated network traffic policy, wherein the configuration data includes routing information for the proxy service and specifies which ports are to be used for routing traffic, how routes are to be configured, and certificates and keys for servers;

monitoring, using the web application firewall, first traffic to a web application running in the first container-based architecture and second traffic intended for a noncontainer application that is outside of the first container-based architecture; and processing the first network traffic based on the updated network traffic policy by using a fully qualified domain name (FQDN) to track the IP address of the web application running in the first container-based architecture; and processing the second network traffic based on the updated network traffic policy in accordance with the configuration data received by the API service by routing traffic to the application that is outside of the first container-based architecture through the use of at least one fully qualified domain name (FQDN).

17. The computer program product of claim 16 further comprising computer executable code that, when executing on one or more processors, performs the steps of:

periodically referencing the first object store to obtain configuration data, and confirming the web application firewall is configured in accord with the configuration data obtained from the first object store.

18. The computer program product of claim 16 further comprising computer executable code that, when executing on one or more processors, performs the steps of:

replicating the updated network traffic policy from the first object store to a second object store associated with a second container-based architecture including a second web application firewall, and configuring the second web application firewall in accord with the updated network traffic policy.

19. The computer program product of claim 18 further comprising computer executable code that, when executing on one or more processors, performs the steps of:

periodically referencing the second object store to obtain configuration data, and confirming the second web application firewall is configured in accord with the configuration data obtained from the second object store.

20. The computer program product of claim 16 wherein the updated network traffic policy is specific to an application.

* * * * *